United States Patent [19]
Fukuzaki

[11] Patent Number: 5,635,684
[45] Date of Patent: Jun. 3, 1997

[54] POSITION DETECTING DEVICE AND ITS METHOD

[75] Inventor: Yasuhiro Fukuzaki, Kitasaitama-gun, Japan

[73] Assignee: Wacom Co., Ltd., Japan

[21] Appl. No.: 367,891

[22] Filed: Jan. 3, 1995

[30] Foreign Application Priority Data

Dec. 5, 1994 [JP] Japan ................................. 6-329942

[51] Int. Cl.$^6$ ........................................................ G08C 21/00
[52] U.S. Cl. ........................................................ 178/19
[58] Field of Search .................... 178/18, 14; 395/156, 395/173, 174

[56] References Cited

U.S. PATENT DOCUMENTS

| | | | |
|---|---|---|---|
| Re. 34,187 | 3/1993 | Yamanami et al. | 178/19 |
| 5,023,408 | 6/1991 | Murakami et al. | 178/19 |
| 5,028,745 | 7/1991 | Yamanami et al. | 178/19 |
| 5,130,500 | 7/1992 | Murakami et al. | 178/19 |

FOREIGN PATENT DOCUMENTS

| | | |
|---|---|---|
| 0259894 | 3/1988 | European Pat. Off. . |
| 0457219 | 11/1991 | European Pat. Off. . |
| 0499641 | 8/1992 | European Pat. Off. . |
| 0565852 | 10/1993 | European Pat. Off. . |
| 0607694 | 7/1994 | European Pat. Off. . |
| 253805 | 11/1990 | Japan . |
| 3147012 | 6/1991 | Japan . |

OTHER PUBLICATIONS

European Search Report, Dated Mar. 11, 1996, Appl. No. EP 95 10 0477.

*Primary Examiner*—Wellington Chin
*Assistant Examiner*—Paul Loomis
*Attorney, Agent, or Firm*—Joseph W. Berenato, III

[57] ABSTRACT

A device for detecting position which has a good S/N performance and which can be easily designed is provided. Said device has the feature of: a plurality of antennae in which three or more turns of loop coils are arranged in parallel; a transmitting circuit for transmitting an electromagnetic wave via one of the antennae; a receiving circuit for receiving a responding electromagnetic wave from the position indicator; a selecting circuit for selecting one of the antennae; a transmitting/receiving switch circuit for connecting the selected antenna to either of said transmitting circuit or said receiving circuit; a connecting control circuit for controlling operations of the selecting circuit and the transmitting circuit; and a discriminator circuit for discriminating the position and the state of said switch based upon the characteristics of a signal received to send the discriminated information. Said connecting control circuit selects an antenna predicted to be the most proximate antenna to said position indicator during transmission operation of the indicator; and controls such that each of said antennae is sequentially selected to be scanned for reception during receiving operation.

7 Claims, 5 Drawing Sheets

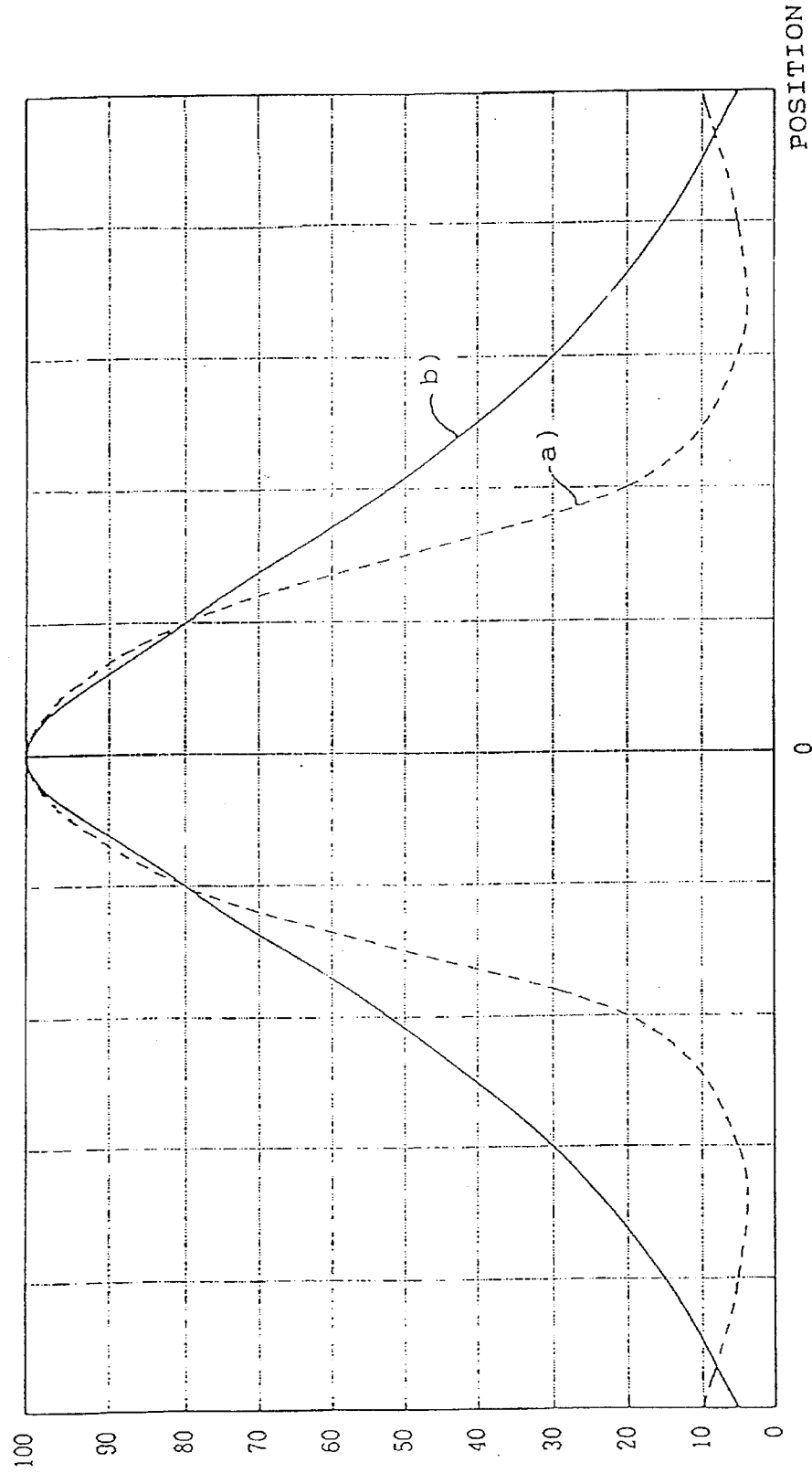

POSITION DETECTING DEVICE AND ITS METHOD

BACKGROUND OF THE INVENTION

1. Field of the Invention

The present invention relates to a position detecting device having a cordless position indicator and its method.

2. Description of Prior Art

There is an electromagnetic transceiver system that is a method of position detecting for digitizers. This has an arrangement including, for example, a position detecting plane in which a large number of loop coils are disposed in parallel, with a position indicator such as a pen or a cursor display, wherein the loop coils are respectively used as sensors i.e. antennae, by utilizing electromagnetic interaction generated between the loop coils and the position indicator to transmit and receive electromagnetic waves between them. Based upon resulting signals detected therefrom, the system retrieves coordinate information of the indicator itself as well as other information. Through this system could be provided a principle feature. That is, that the position indicator is of a cordless system. The present applicant has proposed several digitizers in accordance with this method of electromagnetic transceiver system in Japanese Patent Gazette No. H2 (1990)- 53805, and Japanese Patent Application Laying- Open No. H3 (1991)-147012. One of the principal objects in these Patent and Patent applications is how to retrieve information from a received signal which is free from noise and at high speed.

In the method of electromagnetic transceiver system, for example, a transceiver operation is performed in which one of the antennae is sequentially selected for transmitting an electromagnetic wave and also receiving the electromagnetic wave reflected back from a resonance circuit or coil disposed within the position indicator via the selected antenna, and an arithmetic operation is performed which includes interpolation based upon the signals received via antenna which is predicted to be the strongest receiving signal and its adjacent antennas for determining the coordinate of the position indicator.

For obtaining accurate coordinate information, it is effective to place a number of antennas close to one another. But it makes the switch needed to select one of the antennae and associated control means large and complex. Therefore, it is desirable to perform detection operation with a decreased number of antennae and still with accuracy.

In the method mentioned above, the electromagnetic waves radiating back from the position indicator have very weak energy so that they cause the detection to be difficult, and if the position indicator is remotely positioned from the position detecting plane, the detection is made even more difficult. Therefore, various kinds of measures against noise are proposed by utilizing a high performance amplifier, or a low noise level signal processor, but the improvement of S/N requires a very sophisticated technique, or makes the structure more complicated and hence adds to costs.

Furthermore, applications wherein the position detecting device is equipped within the display portion of the computer, e.g. a so called "pen computer", in combination with a liquid crystal display, have come into wide use recently. When the device is used in such a high noise circumstance, more powerful anti-noise characteristics are required. Also when the device is used in combination with the liquid crystal display, the position indicator and the sensors are required to interact with each other with positioning the liquid crystal display between them since the sensors of the detecting device are disposed beneath the liquid crystal display. Therefore, it is necessary that the functionally allowable detection level of the position indicator be set higher than that of the normal position indicator. The difficulty is however increased further when the detectable level of the position detector is set higher since the signal becomes weaker in accordance with this fact. In addition, the thickness of the liquid crystal display is increasing as the recent colorization and TFT (thin film transistor) application is increasingly adapted. Accordingly, such a system is highly desired, having improved S/N performance.

Generally two groups of antennae, having the same structure to obtain two dimensional coordinate information are disposed, overlapping each other in both X and Y axes directions on the position detecting plane. For practical fabrication of these groups of antennae, the printed wiring board technique is used. Since one group of antennae is required for each of two directions (X and Y axes), a corresponding wiring pattern is provided on each layer of a two-layered printed wiring board. Each of the groups of antennae of X and Y axes has a pattern which is formed by a number of loop coils arranged in parallel on the board, each of the loop coils having folded portions, and a pattern for one axis is placed such that the folded portions of the other loop coils, which forms the pattern of the other axis, come to the inside of the former pattern. This minimizes the ineffective area, wherein no coordinate information for both X and Y axes is provided, so that the position detecting plane can be most effectively utilized. Select terminals for transmitting/receiving signals to loop coils X1, X2, . . . xn, which form a group of antennae, are shown in FIG. 2 respectively with x1, x2, . . . xn. The operation of a signal transmitting/receiving and antenna selecting circuit 102a, and a transmitting/receiving switching circuit 105a are controlled by a control circuit 101a. As shown in FIG.2, when the select terminal x6 is selected for example, the transmitting circuit 102a is firstly connected to the switching circuit 105a for sending transmission signal to loop coil x6, then the transmitting/receiving switch circuit 106a is switched to a receiving circuit 103a. As a result of the transmitting/receiving electromagnetic wave between the loop coil x6 and the position indicator, a receiving signal is generated on the loop coil x6, which is supplied to the receiving circuit 103a via the select terminal x6. Thereafter, the receiving signal is suitably processed to analyze the information included within its amplitude and phase in a discrimination circuit 104a. The transmitting/receiving operation of the respective loop coil is sequentially performed on the loop coils x1–xn.

In the above mentioned operation, it is known that the loop coil for transmitting or receiving electromagnetic wave operates more effectively as the number of turns of the coil becomes larger. Even when the current of the transmitting signal is not changed, an increment in the number of turns make an increment of strength of the transmitting electromagnetic wave in proportion to the number of turns. The same is also true with increased signal strength in receiving in proportion to the number of turn even when the strength of receiving signal is not changed. Particularly, as in the above mentioned patent application, the system in which the loop coil is commonly used as the transmitting and receiving antenna, can provide an increased efficiency both in the transmission and the reception so that it has an excellent S/N performance.

However, as shown in FIG. 2, the number of turns in each of the loop coils is practically limited to a maximum of two.

The reason is that the folded portions of the loop coils forming a pattern of one coordinate is required to be located within the antenna pattern of the other coordinate as mentioned above in order to minimize the ineffective area. Referring to FIG. 2, the folded portions of loop coils X1 and X 2 are designated with 1 and 2, respectively. In this description, each interval between loop coils disposed adjacent each other, (that is, the layout interval), is designated "a", and the width of each loop coil is designated "b" as parameters which show the layouts of the loop coils.

FIG. 3 shows that the folded portions of each of the loop coils are put within the pattern for the other axis of coordinate. In FIG. 3, the patterns are designed so that the folded portions at the select terminals side of the loop coils X1, X2, ... X14, arranged in the direction of the X axis, are all put within an interval "a1" between the loop coil Y1 and the loop coil Y2, which are disposed at the underside end among the loop coils arranged in the direction of the Y axis. In addition, the patterns are designed so that the folded portions located opposite to the select terminal side of the loop coils X1, X2, ... X14 are all put within an interval "a2" between the loop coil Y10 and the loop coil Y11. Further, the patterns are designed so that the folded portions located opposite to the select terminal of the loop coils Y1, Y2, ... Y11, arranged in the direction of the Y axis are all put within an interval "a3" between the loop coil X1 and the loop coil X2, which are disposed at the distal end of the loop coils arranged in the direction of the X axis. In addition, the patterns are designed so that the folded portions at the select terminal side of the loop coils Y1, Y2, ... Y11, are all put within an interval "a4", between the loop coil X13 and the loop coil X14.

As apparent from the above description, all folded portions of the loop coils for one axis are required to be located within one of the layout intervals of the loop coils for the other axis. There also exists such a case where the folded portions of the loop coils of one axis are forced to arrange utilizing twice the portions of the layout interval of the loop coils of the other axis. In any case, it is clear that difficulty may arise in simply increasing the number of turns of loop coils since the complicated pattern design is required in order to locate every folded portion of a number of loop coils within the layout interval of a limited size. As the number of turns is increased, the number of patterns is also increased in proportion to the number of overlapped coils between adjacent loop coils. In FIG. 3, it is clear that up to 5 loop coils, such as the loop coils X1 to X5 (i.e. the number of overlaps is 5) are overlapped together, and the area where the greatest running number of folded potions exists, needs 2×5 wirings, in total 10 wirings. (For example, the portions designated by the numerals 100 and 110 as shown in FIG. 3). Therefore, not only the number of patterns themselves, but also the numbers of connecting potions, (such as through-holes), increased so that the number of turns are limited to 2 in prior arts.

Of course, if a multilayer printed wiring board is employed rather than a double layer printed wiring board, the number of turns can be increased further. However, in that case, the cost problem become significant, which makes the product impractical.

SUMMARY OF THE INVENTION

It is therefore an object of the present invention to provide a position detecting device having good S/N characteristics by increasing the number of turns of loop coils of antenna for transmitting/receiving electromagnetic waves in the position detecting device.

It is a further object of the present invention to provide a position detecting device having antenna patterns, which can be simply formed at a low cost without increasing any difficulties in designing the pattern even when the number of turns of loop coils is increased.

For accomplishing the above mentioned objective, the present invention provides an innovative scanning method for scanning a lot of loop coils, wherein it provides a means for separately selecting a antenna in transmission and reception, while conventionally, a paired transmission and receiving operation is performed with one selected antenna in the sequentially scanning manner. In a preferred embodiment of the present invention, a method is provided in which, firstly, in transmission an antenna is always selected which is predicted to be the most proximate antenna to a position indicator. Via said antenna, a signal is then transmitted to said position indicator, and all antennae are scanned to get signal characteristic distribution required for a coordinate detection in receiving the electromagnetic waves reflected back from the position indicator due to the electromagnetic interaction effect between them in response to the transmitted signal.

According to the scanning method of the present invention, an advantage can be attained, as the distance between the position indicator and the antenna is being increased while maintaining the ability to receive substantially the same strength of electromagnetic wave. That is, according to the new scanning method of the present invention, the detectable electromagnetic wave from the position indicator can be reached to more remote area than that of the prior art.

Thereby, the present invention provides, an increased layout interval between antennae than the prior art resulting in a reduced number of antennae. This also means that the number of overlaps of the loop coils can be reduced so that it gives sufficient room for disposing folded portions of the loop coils respectively forming the antennae. Utilizing the space allows an antenna pattern with an increased number of turns than the prior art.

In another embodiment of the antenna scanning method of the present invention, scanning is performed for all of the antennae during the transmission period which is required in detecting the coordinates of an object, and the most proximate antenna to the position detector may be selected for receiving an electromagnetic wave in regard to receiving an electromagnetic wave generated by the electromagnetic interaction effect between the respective antenna and the position indicator.

The present invention provides a new scanning method for transmitting and receiving as mentioned above, which allows room in designing the antenna pattern. Thus,the number of turns of the loop coils forming the antenna can be increased, which in turn increases the efficiency of the antennas and, can prove significantly increased S/N performance.

BRIEF DESCRIPTION OF THE DRAWINGS

FIG. 5 is a graphical representation of the characteristic curve s of the strength of receiving signals of the prior art a) and the embodiment b) according to the present invention.

DESCRIPTION OF THE PREFERRED EMBODIMENTS

Figure 1:
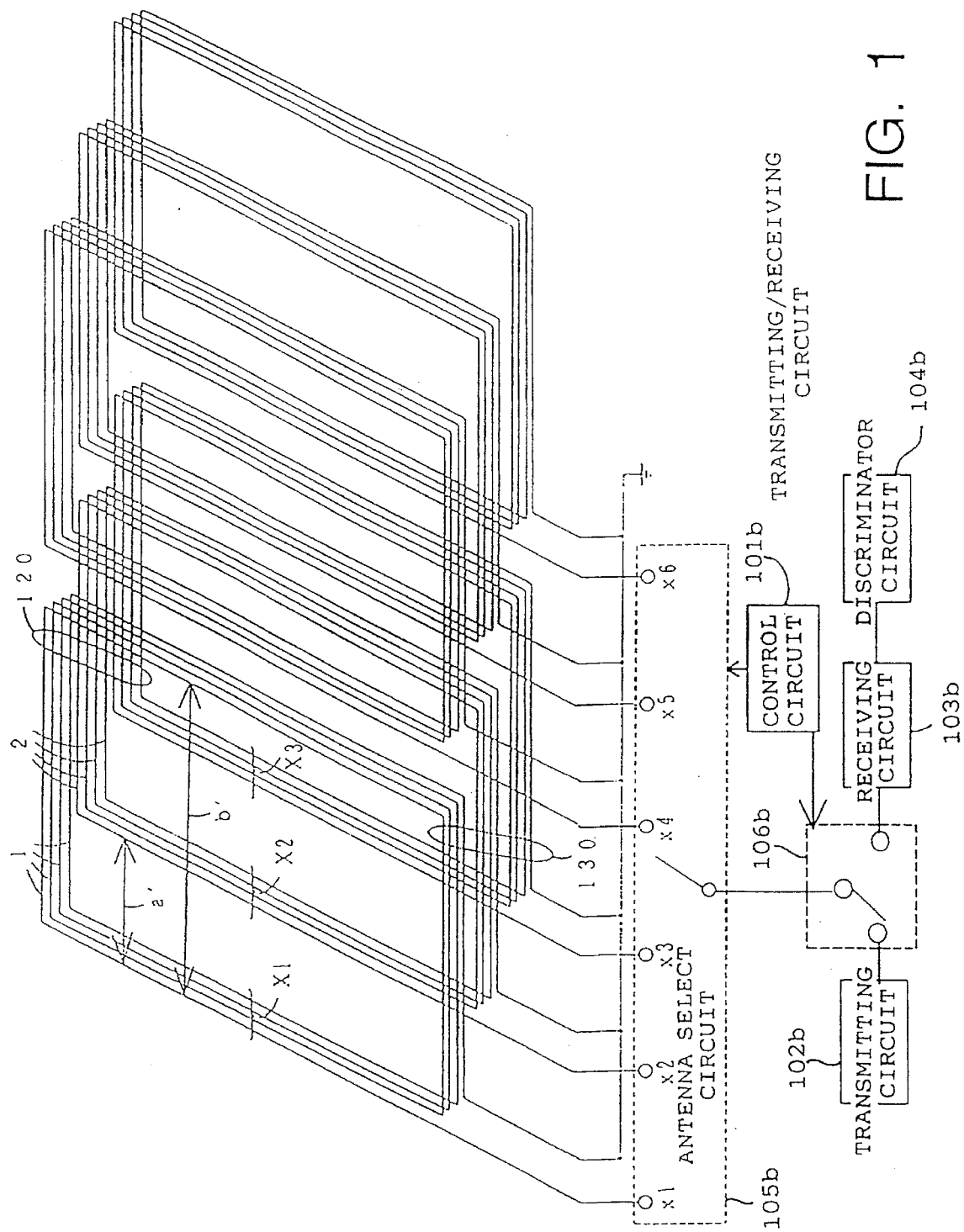
FIG. 1 is a schematic diagram showing an arrangement of an embodiment of a position detecting device according to the present invention.
Figure 2:
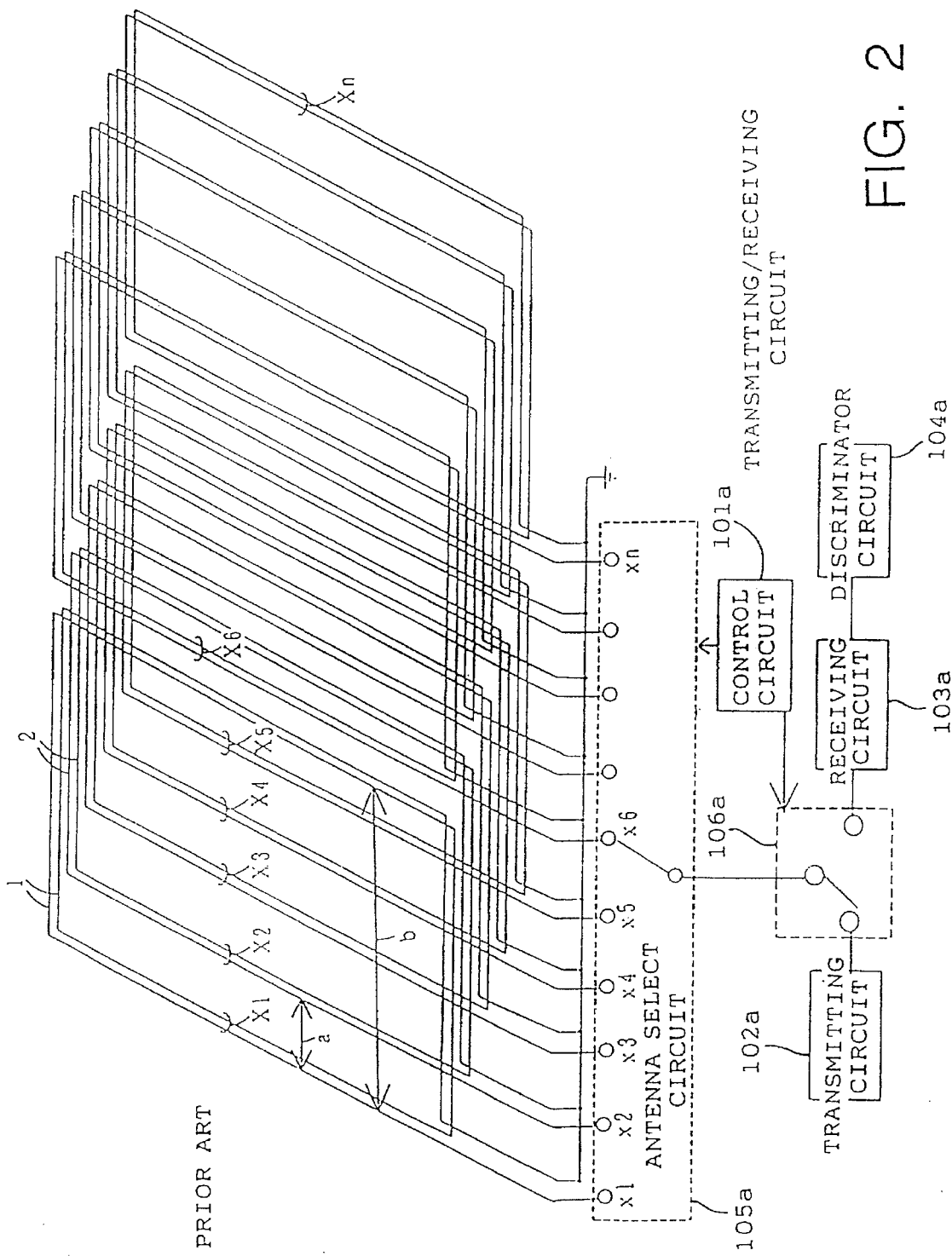
FIG. 2 is a schematic diagram showing an arrangement of an illustrative exemplification of a position detecting device of the prior art.
Figure 3:
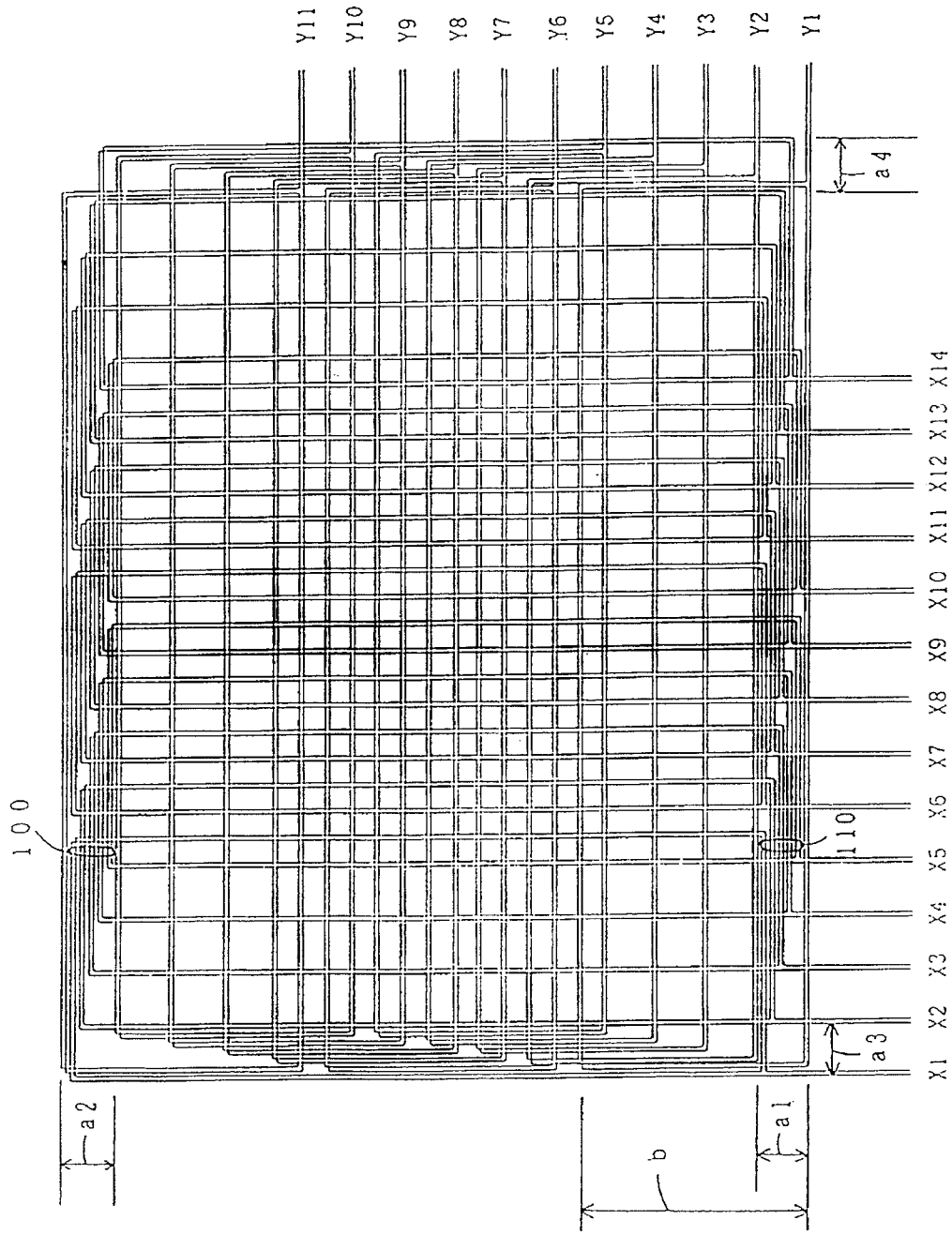
FIG. 3 is a plan showing two pairs of antennae orthogonally disposed to each other such that each of the folded portions of loop coils becomes located within a respective pattern of loop coils of the other axis.

FIG. 1 is a schematic diagram showing an arrangement of an embodiment of a position detecting device according to the present inventions. In FIG. 1, the loop coils 1 and 2 forming one of antennae have the width "b" which is the same as the width "d" of the loop coils of the example of the prior art mentioned above and shown in FIG. 2, but a layout interval "a'" between adjacent loop coils is expanded more than the corresponding layout interval "a'" of the prior art shown in FIG. 2. Assuming now that the width "b" of the loop coils is equal to 1, the layout interval "a'" of the preferred embodiment of the present invention is equal to $\frac{2}{5}$ thereof as shown in FIG. 1, while the layout interval "a" of the prior art is $\frac{2}{9}$ as shown in FIG. 2. That is, the layout interval "a'" of this preferred embodiment is less than 2 times the interval "a" of the prior art. In addition, the number of overlaps is decreased to 3 (X1, X2, and X3), compared with the number of 5 of overlaps in the prior art. These three folded portions of the antenna are arranged over a single layout interval of the antenna of the other axis. Since the layout interval of the antenna of the other axis is the same "a'" which is larger than that of the prior art, the area itself is made larger on which the folded portions are arranged. Therefore, in the preferred embodiment as shown in FIG. 1, the number of turns is increased to 4. In this case, 3×4 wirings, that is, 12 wirings are required at the portion where the running number of loop coils are most highly overlapping (the corresponding portions are designated by the numerals 120 and 130 as shown in FIG. 1), but these portions do not raise any problem since the area itself, on which the folded portions are located, are correspondingly made large.

According to the present invention, increasing the maximum allowable number of turns of the antenna can easily be attainable from the two of the prior art to four, that is twofold.

Figure 4:
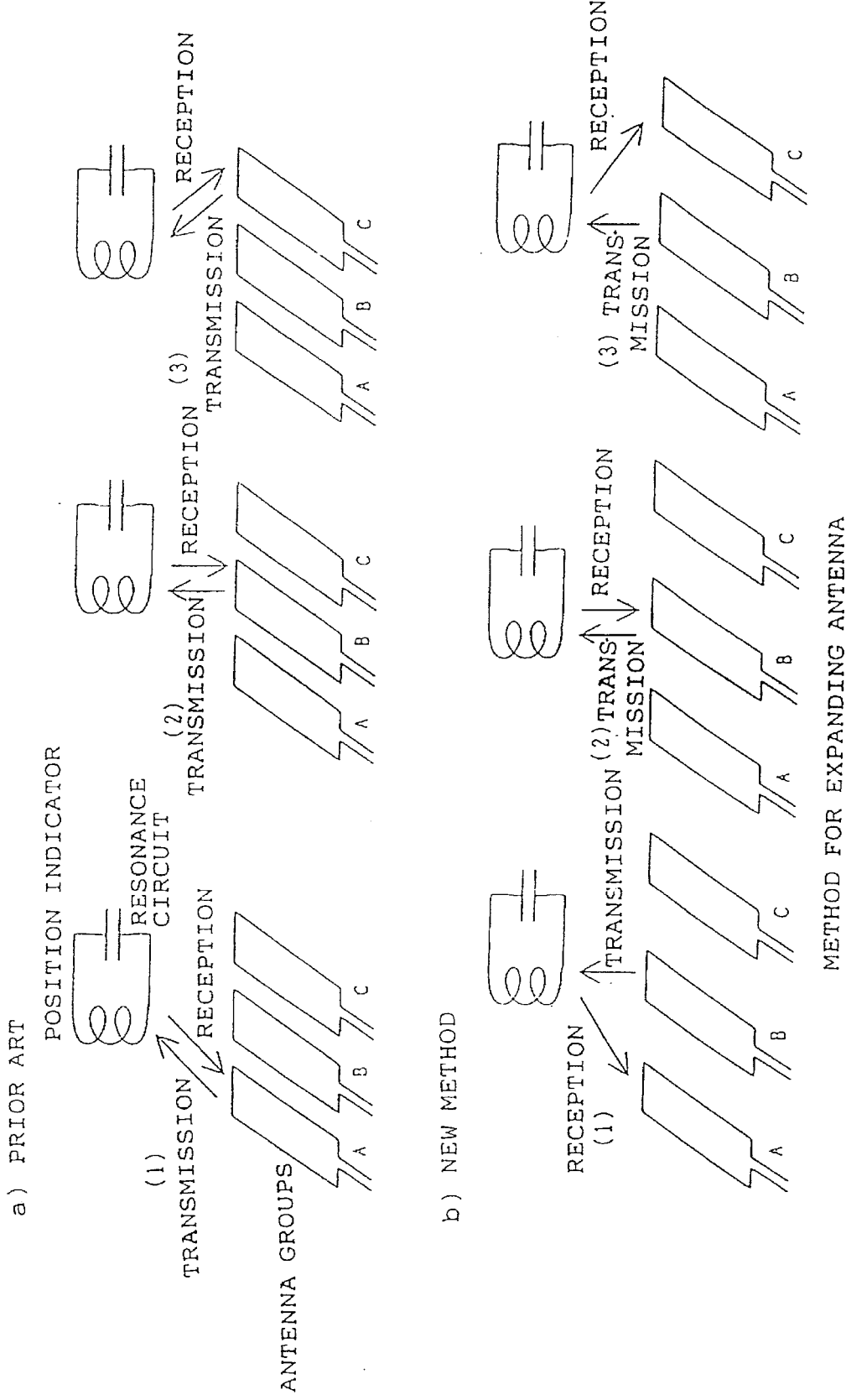
FIG. 4 shows illustrative views of scanning methods of antennae of a prior art example a) and the embodiment b) of the present invention during the transmission and reception periods.

The description will now be made as regard to a method of scanning antennae during transmission and reception period according to the present invention, which allows the layout interval to expand from that of the conventional method. FIG. 4 shows illustrative views of scanning methods of antennae of a prior art example (FIG. 4a) and the embodiment (FIG. 4b) of the present invention. For simplifying the description, a group of antennae comprising a number of antennae are shown with only three antennae A, B, and C. Conventionally, as shown in FIG. 4a, the antenna A is selected to be set to transmission state, and then switched to reception state. A responding electromagnetic wave is produced, caused by an electromagnetic interaction effect between the transmitted electromagnetic wave and a resonant circuit positioned within the position indicator. (1) The responding electromagnetic wave is received with the same antenna A, which transmits a received signal to a discriminator circuit 104a via a receiving circuit 103b. (2) Next in similar manner, an antenna B is selected, which obtains a received signal and sends it to the discriminator circuit 104a. (3) Again in a similar manner, an antenna C is selected, which obtains a receiving signal to the discriminator circuit 104a. In this manner in the prior art, transmission and reception are performed with such a paired operation for the selected antenna. The characteristic curve of strength of the receiving signal obtained via scanning the antennae by the prior art method is shown by a dotted line curve a) in FIG. 5.

While in operation according to the referred embodiment of the method for scanning antennae of the present invention as shown in FIG. 4b, (1) an antenna B is selected which is predicted to be the most proximate antenna to the position indicator, and which is set to transmission state for transmission. A responding electromagnetic wave is produced by an electromagnetic interaction effect between the transmitted electromagnetic wave and the resonant circuit located within the position indicator. Firstly, the antenna A is selected to be set to the receiving state and performs the receiving operation, and sends received signal via the receiver circuit 103b to the discriminator circuit 104b. (2) Next,the antenna B is again set to the transmission state and performs transmitting operations. Then the antenna B is selected to be set to the reception state and performs the receiving operation, and the received signal is sent via the receiving circuit 103b to the discriminator circuit 104b.

(3) Furthermore, the antenna B is again set to the transmission state and performs transmission operation. Then,the antenna C is selected to be set to the receiving state, and the received signal is sent to the discriminator circuit 104b. Thus, according to the embodiment of the method for scanning antenna of the present invention as shown in FIG. 4b, a plurality of groups of antennae is scanned only during the receiving operation, and the transmission operation is always performed via the antenna B which is predicted to be the most proximate antenna to the position indicator. The characteristic curve of strength of the receiving signal, which is obtained by scanning the antennae according to the method of the present invention, is shown by a solid line curve b) in FIG. 5.

As mentioned above, FIG. 5 is a graphical representation of the characteristic curves of the strength of receiving signals obtained by scanning the antennae wherein the curve a) shows a distribution of the strength of the signal according to the prior art method for scanning antenna, and the curve b) shows a distribution of the strength of the signal according to the method for scanning antenna of the present invention. The abscissa shows a relative antenna position, and the center (0) of the coordinate is taken where the maximum signal strength is appearing. It can be seen that the distribution curve b) of the present invention has a broad strength distribution as compared with the prior art curve a), i.e. it has the area of the antenna position of the same signal strength in wider area than that of prior art. This also means that it ensures detection with the same accuracy as the prior art, even though the antenna layout interval between the antennae is increased more than that of the prior art. As a result of this, an increase of the layout interval between the antennae is attained with to the present invention.

In another embodiment of the present invention, a plurality of groups of antennae is sequentially scanned during transmission, and the reception may always be performed by the antenna which is predicted to be the most proximate antenna to the position indicator. That is, if described with reference to FIG. 4, firstly the transmission is performed via the antenna A and the reception is performed via the antenna B. Next, the transmission is performed via the antenna B and the reception is performed via the antenna B. Furthermore the transmission is performed via the antenna C and the reception is performed via the antenna B.

According to any embodiment mentioned above in detecting the coordinate, the scanning should be done to each of the groups of antennae arranged in the direction of the axis of the coordinate to be detected in regard to the groups of antennae to be scanned, while the scanning may not always be done to the groups of antennae arranged in the direction of the axis of coordinate, in regard to the single antenna which is predicted to be the most proximate antenna to the position indicator. For example, in detecting the X coordinate, in the case where a method is applied wherein a single transmission antenna is fixed, and the receiving antennae are scanned, the antennae to be scanned should be arranged along the direction of the X axis. The single transmission antenna to be fixed is not required to be selected from the groups of antennae arranged in the X axis, but it may be selected from the groups of antennas arranged in the Y axis. Even when an antenna, which belongs to another axis is to be selected as the fixed antenna, it must be the most proximate antenna to the position indicator.

For accomplishing the method of scanning antenna according to the present invention, the device portions including the transmitting/receiving switch circuit associated with the scanning, the control circuit and the like correspond to the method of the present invention. According to the present invention, as described above, the number of antennae can be decreased so that these circuits can be simplified.

According to the present invention, a new scanning method is introduced for the transmission and reception of the groups of antennae of the position detecting device, thereby allowing the layout interval of the antennae to be expanded and the number of antennae to be decreased.

Therefore, the number of circuits for switching the antennae and the units with regard to said circuits such as the control circuit can be simplified and reduced.

The layout interval between the antennas can be expanded to allow an increased number of turns of each antenna. Thereby, S/N of the device can be greatly improved so that the units such as a receiving circuit, a signal processing circuit and the like are significantly simplified. The combination with a liquid crystal display can be attained by using the present invention rather than that of the prior art since the detecting performance has been greatly improved.

What we claim is:

1. A position detecting device comprising a resonant circuit and a cordless position indicator in which at least one switch is mounted, wherein said position detecting device includes:

a plurality of antennae arranged in parallel in a direction of detecting position at a predetermined interval and partly overlapping each other;

a transmitting circuit for transmitting an electromagnetic wave, which has a proximate frequency to the resonance frequency of said resonant circuit located within said position indicator via one of said antennae;

a receiving circuit for receiving via said one of antennas a responding electromagnetic wave which is produced by an electromagnetic interaction effect between said electromagnetic wave and said resonant circuit;

a selecting circuit for selecting one of said antennae;

a transmitting and receiving switch circuit for connecting said selected antenna to either of said transmitting circuit or said receiving circuit;

a connecting control circuit for controlling operations of said selecting circuit and said transmitting circuit; and a discriminator circuit for discriminating the position of said position indicator and the state of said switch in the indicator based upon the characteristics and distributing state of a signal received by said receiving circuit and transmitting information derived from said signal to an associated upper information processing device;

said connecting control circuit selects an antenna predicted to be the most proximate antenna to said position indicator during transmission operation of the indicator, and controls such that each of said antennae is sequentially selected to be scanned for reception during receiving operation.

2. A position detecting device comprising a resonant circuit and a cordless position indicator in which at least one switch is mounted, wherein said position detecting device includes:

a plurality of antennae arranged in parallel in a direction of detecting position at a predetermined interval and partly overlapping each other;

a transmitting circuit for transmitting an electromagnetic wave, which has a proximate frequency to the resonance frequency of said resonant circuit located within said position indicator via one of said antennae;

a receiving circuit for receiving via said one of the antennae a responding electromagnetic wave which is produced by an electromagnetic interaction effect between said electromagnetic wave and said resonant circuit;

a selecting circuit for selecting one of said antennae;

a transmitting and receiving switch circuit for connecting said selected antenna to either of said transmitting circuit or said receiving circuit;

a connecting control circuit for controlling operations of said selecting circuit and said transmitting circuit; and a discriminator circuit for discriminating the position of said position indicator and the state of said switch based upon the characteristics and distributing state of a signal received by said receiving circuit and transmitting information derived from said signal to an associated upper information processing device;

said connecting control circuit controls such that each of said antennae is sequentially selected to be scanned for transmission during transmission operation of said position indicator, and selects an antenna predicted to be the most proximate antenna to said position indicator during reception operation.

3. A position detecting device as claimed in one of claims 1 and 2, wherein each of said antennae is formed with loop coils, the number of turns of which are equal to three or more.

4. A position detecting device as claimed in one of claims 1 and 2, wherein said antennae are arranged into two groups of antennae and orthogonally disposed with respect to the other;

each of said groups of antennae is formed with patterns on a respective layer of a double layer printed wiring board, and folded portions of said patterns of loop coils forming one group of said antennae are disposed within the patterns of loop coils forming the other groups of said antennae.

5. A method for detecting position using a resonant circuit and a cordless position indicator in which at least one switch is mounted, wherein said method comprising the following steps:

arranging a plurality of antennae in parallel in a direction of detecting position at a predetermined interval and partly overlapping each other;

transmitting an electromagnetic wave, which has a proximate frequency to the resonance frequency of said resonant circuit located within said position indicator via one of said antennae;

receiving via said one of antennae a responding electromagnetic wave which is produced by an electromagnetic interaction effect between said electromagnetic wave and said resonant circuit;

selecting one of said antennae;

connecting said selected antenna to either of said transmitting circuit or said receiving circuit to switch to transmission or reception operation;

controlling operation of said selecting, and said transmission and reception operation; and discriminating the position of said position indicator and the state of said switch in the indicator based upon the characteristics and distributing state of a signal received and transmitting information derived from said signal to an associated upper information processing device;

in said controlling step, selecting an antenna predicted to be the most proximate antenna to said position indicator during transmission operation of the indicator, and controls such that each of said antennae is sequentially selected to be scanned for reception during receiving operation.

6. A method for detecting position using a resonant circuit and a cordless position indicator in which at least one switch is mounted, wherein said method comprising the following steps:

arranging a plurality of antennae in parallel in a direction of detecting position at a predetermined interval and partly overlapping each other;

transmitting an electromagnetic wave, which has a proximate frequency to the resonance frequency of said resonant circuit located within said position indicator via one of said antennae;

receiving via said one of the antennae a responding electromagnetic wave which is produced by an electromagnetic interaction effect between said electromagnetic wave and said resonant circuit;

selecting one of said antennae;

connecting said selected antenna to either of said transmitting circuit or said receiving circuit to switch to transmission or reception operation;

controlling operation of said selecting, and said transmission and reception operation; and discriminating the position of said position indicator and the state of said switch based upon the characteristics and distributing state of a signal received and transmitting information derived from said signal to an associated upper information processing device;

in said controlling step, each of said antennae is sequentially selected to be scanned for transmission during transmitting operation and selects an antenna predicted to be the most proximate antenna to said position indicator during receiving operation of the indicator.

7. A method of detecting the position of a cordless position indicator relative to a plurality of antennae, the method comprising the steps of:

providing first, second, and third antennae in a parallel and at least partial overlapping manner so as to define a predetermined interval;

selecting one of said first, second, and third antennae as a transmitting antenna, the selected antenna being the one predicted to be most proximate the cordless position indicator;

transmitting via the selected antenna an electromagnetic wave of a frequency proximate a resonance frequency of a resonant circuit in the position indicator; and scanning said first, second, and third antennae in order to receive position indicative information output from the resonant circuit of the position indicator in response to the wave transmitted by the selected antenna.

* * * * *